(No Model.) 2 Sheets—Sheet 2.
C. O. HILLSTROM.
MECHANISM FOR TESTING REED ORGANS.
No. 437,201. Patented Sept. 30, 1890.
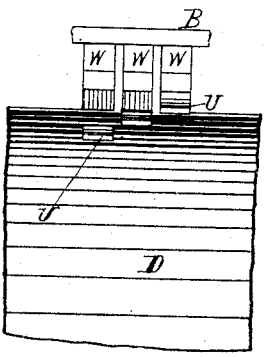
Fig. 3.
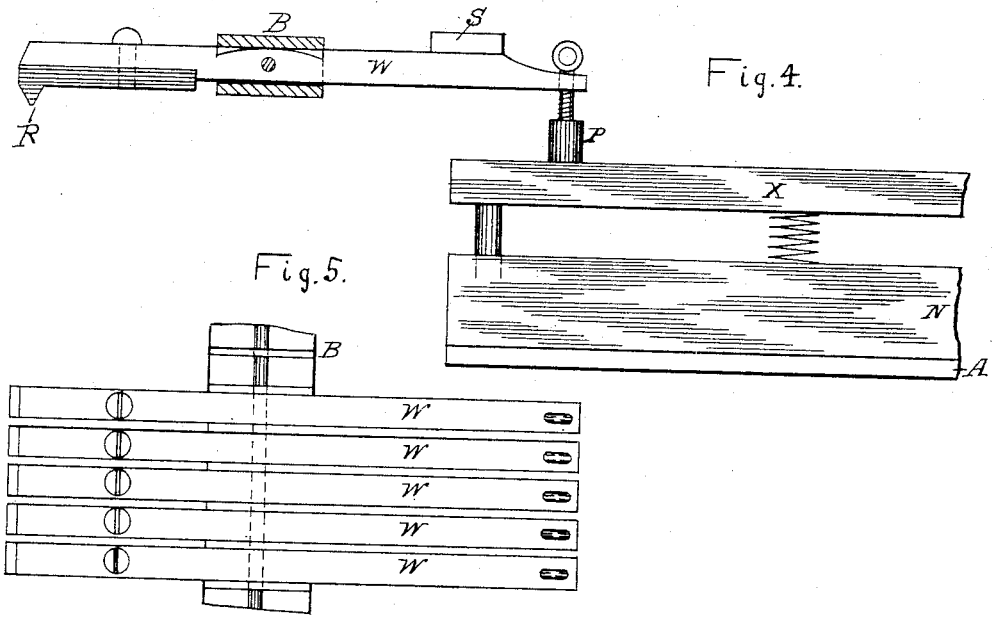
Fig. 4.
Fig. 5.
Witnesses:
Thomas Long.
R. R. Lathrop.
Inventor.
Charles O. Hillstrom
By G. L. Chapin.
Atty.

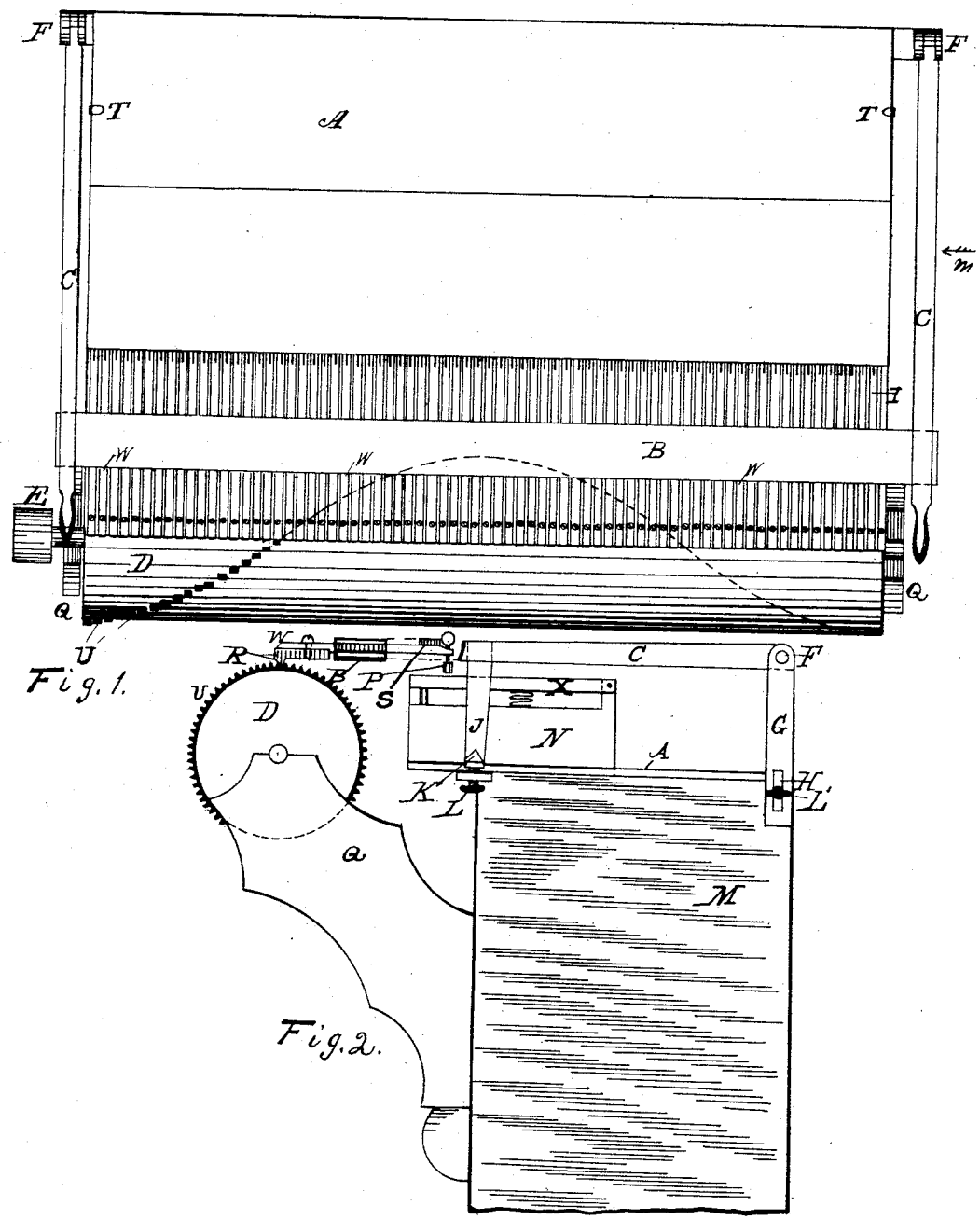

UNITED STATES PATENT OFFICE.

CHARLES O. HILLSTROM, OF CHESTERTON, INDIANA.

MECHANISM FOR TESTING REED-ORGANS.

SPECIFICATION forming part of Letters Patent No. 437,201, dated September 30, 1890.

Application filed March 3, 1890. Serial No. 342,340. (No model.)

*To all whom it may concern:*

Be it known that I, CHARLES O. HILLSTROM, a citizen of the United States, and a resident of Chesterton, in the county of Porter and State of Indiana, have invented new and useful Improvements in Mechanism for Testing Organ-Actions, of which the following is a specification, reference being had to the annexed drawings illustrating the invention, in which—

Figure 1 is a plan view of a bellows-case, the key-board, and reed-case of an organ and my devices for testing the operating parts. Fig. 2 is an end view of Fig. 1, looking in the direction of dart $m$; Fig. 3, Sheet 2, an enlarged front end view of three of the hammers, and a broken enlarged elevation of the cylinder and trip-pins; Fig. 4, Sheet 2, an enlarged elevation of a hammer, key, and reed-case; Fig. 5, an enlarged plan of a few hammers and the cross-bar broken away to show the partitions separating them.

This invention will be best understood by the following detailed description and claims.

The combined key-board and reed-case as they are now made is removably secured to a fixed bellows-box, and the cylinder by means of suitable brackets is hung to be a fixture with the box, whereby the actions of an organ can be placed on the bellows-box and tested and then be removed and other actions tested in same place by the same means. As a matter of convenience, the bellows and cylinder are to be driven by suitable power, so that an action can be tested in a brief time.

M is an end view of the bellows-box, which is to be a separate fixture to hold a bellows suitable for operating the reeds in the ordinary manner. On top of this box is placed the base A of the ordinary reed-case N, and it is removably secured by ordinary clamps T. Vertically-adjustable standards G at the rear corners of the box M are affixed for the support, respectively, of two arms C, which are pivoted at F F. Each arm is provided with a depending standard J, which by means of a set-screw L, tapped through a stationary portion K on the box, may be raised or lowered to bring the pointed trip-cords R of the hammers properly to the trip-pins U on the cylinder D. A number of hammers I corresponding to the number of organ-keys are pivoted transversely in a bar B, which is notched out to form partitions between the hammers, whereby a single wire the length of the bar pivots all the hammers. The ends of bar are properly secured to the insides of the arms C, so that when they are elevated from the reed-case to permit the latter to be removed another case can be placed in on the bellows-box.

D represents the cylinder hung to brackets Q, which are secured to the box M. The shaft of the cylinder extends far enough out at one end to support a pulley E, on which the belt is to be put to turn the cylinder. Spirally around on the cylinder are affixed a number of trip-pins $u$, corresponding to the number of hammers, whereby, when the cylinder is turned once around, all the hammers, one at a time, will be tripped or suddenly elevated so as to bring adjustable hammer-pads P at their opposite ends down onto the keys $n$ to allow the wind from the bellows to vibrate the reed in the usual manner. Each hammer is weighted at S, so as to remain at all times on the keys with a force less than enough to open the valve below, so that there is no lost motion between the keys and hammers.

Having thus described my invention, I claim and desire to secure by Letters Patent—

1. In mechanism for testing organ-actions, the pivoted arms C C, carrying a bar in which are pivoted hammers corresponding to the number of organ-keys, in combination with a cylinder lying under the front ends of the hammers and provided with trip-pins placed spirally around it, as and for the purpose specified.

2. The arms C C, pivoted to adjustable standards at the rear corners of the bellows-box and carrying depending standards J, in combination with an adjusting-screw at their lower ends, a bar uniting the arms and carrying hammers, and a cylinder provided with trip-pins in a spiral line around it, as and for the purpose specified.

CHARLES O. HILLSTROM.

Witnesses:
G. L. CHAPIN,
JOHN C. COULTER.